United States Patent
Grigo et al.

(10) Patent No.: US 7,667,187 B2
(45) Date of Patent: Feb. 23, 2010

(54) HOLLOW-SHAFT ENCODER WITH MOTOR-SHAFT PROTECTIVE CAP

(75) Inventors: Uwe Grigo, Donaueschingen (DE); Andreas Wöhrstein, Neuhausen (DE)

(73) Assignee: Hengstler GmbH, Aldingen (DE)

( * ) Notice: Subject to any disclaimer, the term of this patent is extended or adjusted under 35 U.S.C. 154(b) by 197 days.

(21) Appl. No.: 11/407,340

(22) Filed: Apr. 20, 2006

(65) Prior Publication Data

US 2006/0254864 A1 Nov. 16, 2006

(30) Foreign Application Priority Data

Apr. 21, 2005 (DE) .................. 20 2005 006 379 U

(51) Int. Cl.
*G01D 5/34* (2006.01)
(52) U.S. Cl. ................................. 250/231.13
(58) Field of Classification Search .................. 250/231.13–231.18; 341/13
See application file for complete search history.

(56) References Cited

U.S. PATENT DOCUMENTS

| 3,894,232 A * | 7/1975 | Laspesa ................. 250/231.13 |
| 4,759,218 A | 7/1988 | Rodi et al. |
| 4,806,752 A * | 2/1989 | Fischer ....................... 359/235 |
| 4,841,187 A | 6/1989 | Hauke et al. |
| 5,057,684 A * | 10/1991 | Service ................... 250/231.13 |
| 5,097,164 A * | 3/1992 | Nakasugi et al. ............... 310/88 |
| 5,808,185 A | 9/1998 | Siraky |
| 6,617,571 B2 * | 9/2003 | Thaler et al. ............ 250/231.13 |
| 7,316,071 B2 * | 1/2008 | Harrer ........................ 33/1 PT |
| 2002/0121519 A1* | 9/2002 | Martin et al. ................ 220/296 |
| 2003/0098251 A1* | 5/2003 | Yang .......................... 206/303 |

FOREIGN PATENT DOCUMENTS

| DE | 35 44 741 A1 | 6/1987 |
| DE | 37 17 180 A1 | 12/1988 |
| DE | G 89 04 395.2 U1 | 6/1989 |
| DE | 196 17 585 C1 | 6/1997 |
| DE | 200 05 529 U1 | 7/2000 |

* cited by examiner

*Primary Examiner*—Thanh X Luu
(74) *Attorney, Agent, or Firm*—Browdy and Neimark, PLLC

(57) ABSTRACT

The invention is concerned with a hollow-shaft encoder with a motor-shaft protective cap, wherein the connection between the motor-shaft protective cap and hollow-shaft encoder is accomplished by means of repeatedly releasable and connectable frictional and/or a form-fitting connection via a relative movement between the motor-shaft protective cap and hollow-shaft encoder. The hollow-shaft encoder incorporates all electrical and mechanical components for the pick-up and output of the measuring signals and no electrical or mechanical components for the pick-up and output of the measuring signals are fixed on the motor-shaft protective cap. The hollow-shaft encoder with the motor-shaft protective cap is more cost effective and simpler in its design, production, assembly, warehousing, maintenance and repair; as well as easier to manipulate.

3 Claims, 4 Drawing Sheets

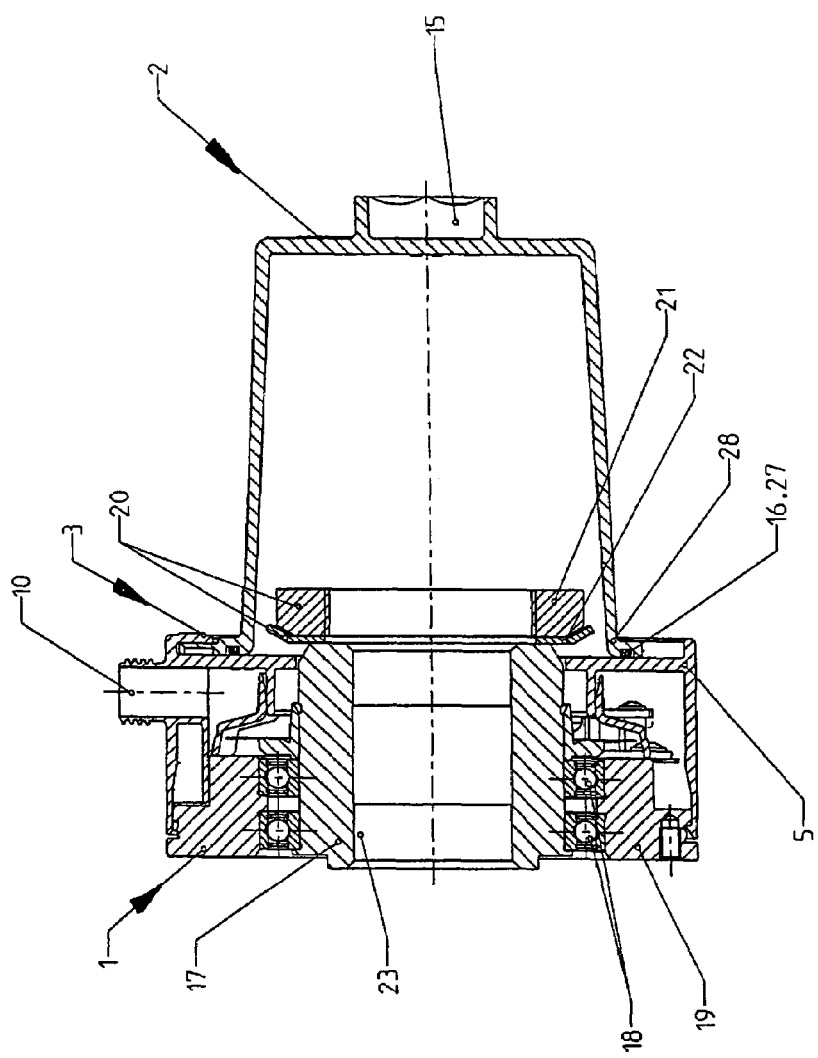
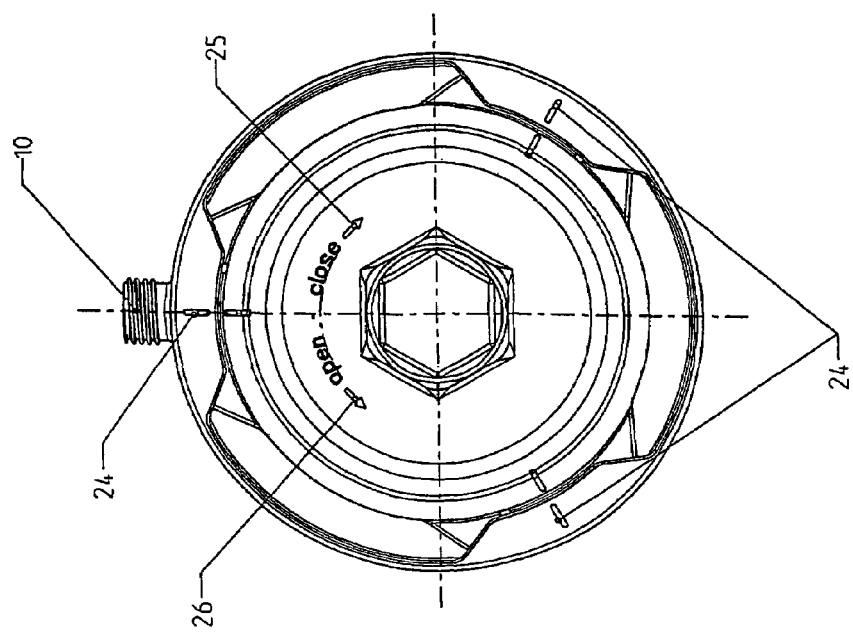
Fig. 4
Fig. 5

HOLLOW-SHAFT ENCODER WITH MOTOR-SHAFT PROTECTIVE CAP

BACKGROUND OF THE INVENTION

1. Technical Field of the Invention

The invention is concerned with a hollow-shaft encoder with motor-shaft protective cap.

2. Prior Art

Numerous hollow-shaft encoders of this type with motor-shaft protective cap are already known from the prior art, wherein the motor shaft of a motor whose parameters, e.g., rate of revolution or position is to be determined, is led through the hollow shaft of the encoder and supported there. The inner bearing ring of the hollow shaft of the encoder is fixed on the motor shaft of the motor in a frictional and/or form-fitting manner and rotates along with it at the same rate of revolution, the outer sensor ring of the encoder remaining stationary. Due to the relative rotation of the inner bearing ring to the stationary outer sensor ring of the encoder, a measuring signal is generated that is proportional to the parameter being determined (e.g., rate of revolution or position of the motor shaft), said measuring signal being routed via an interface unit of the encoder to an external transducer and evaluation unit optionally equipped with a measuring-signal memory and display. The interface unit of the encoder, in the simplest case, is a contact strip, however, it may also already be equipped with a first internal transducer unit, or it may even incorporate an internal evaluation unit that may replace the external evaluation unit.

Especially in the case of elevator machines, the encoder is mounted at the end of the motor and the motor shaft itself passes through the hollow-shaft encoder. During rotation of the shaft the unprotected shaft presents a risk of injury. For this reason, a protective cap is installed on the encoder or over the shaft, which up to now in the prior art is being fastened with a plurality of screws. Since this shaft is used to manually move the elevator up or down in case of an outage of the machine, the protective cap must then be detached from the encoder. Detaching the cap must be performed with an appropriate tool, especially with a small wrench, which is a very tedious and time-consuming process.

With DE 39 39 868 A1, a tachogenerator for brushless motors has become known, wherein the tachogenerator is slipped with its hollow shaft over the motor shaft and frictionally connected via a conical end piece to the motor shaft. The conical end piece is connected to the motor shaft by means of a screw at the face of the free end of the motor shaft.

Various Bayonet-type connections on encoders are known, e.g., from DE 199 23 900 A1, DE 199 48 106 A1, DE 196 41 929 A1, DE 36 09 211 A1, wherein, however, the cover covering the motor shaft always incorporates essential parts of the encoder, such as, e.g., the timing disc, interface unit, or electrical connector block with optical sensor. A shortcoming lies in that a specified angle range must be adhered to for assembly purposes as the relative position between the cover covering the motor shaft and the remaining encoder, which is a hindrance particularly in the case of encoders that are difficult to reach or see, and can thus cause delays in the assembly and possibly damage to the encoder. An additional shortcoming lies in that when the axial length of the motor shaft is altered, the cover and/or remaining base of the encoder must also be altered in their axial lengths, causing significant cost disadvantages in the design, production, assembly, and warehousing.

OBJECT AND SUMMARY OF THE INVENTION

The present invention has as its object to improve a hollow-shaft encoder with motor-shaft protective cap in such a way that it is more cost-effective and simpler in its design, production, assembly, warehousing, maintenance, and repair.

Essential characteristics of the invention are that the connection between the motor-shaft cap and hollow-shaft encoder is accomplished by means of repeatedly releasable and connectable frictional and/or form-fitting connection means via a relative movement between the motor-shaft protective cap and hollow-shaft encoder, and that the hollow-shaft encoder incorporates all electrical and mechanical components for the pick-up and output of the measuring signals and that no electrical or mechanical components for the pick-up and output of the measuring signals are fixed on the motor-shaft protective cap.

This has the advantage that, regardless of the axial length of the free end of the motor shaft, a hollow-shaft encoder can be used that has all required electrical and mechanical components for the pick-up and output of the measuring signals, and a simple and cost-effective motor-shaft protective cap with a correspondingly adapted axial length. One and the same hollow-shaft encoder may thus always be used for any axial length of the free end of a motor shaft, and only a motor-shaft protective cap is required whose axial length has been adapted accordingly. The inventive hollow-shaft encoder with motor-shaft protective cap thus becomes significantly more cost-effective in all aspects, as well as easier to manipulate. It is an added advantage that a quick detachment of the protective cap is possible, which is very important particularly in safety-relevant applications, such as during evacuations of elevators, where quasi every second counts. This means there is no need for a time-consuming search for a tool in order to detach the protective cap.

The solution is an integrated solution in the encoder itself, i.e., the fixing means for the protective cap is integrated in the cover or cap of the encoder. This also means that the protective cap can be installed and detached especially without tools, which is made possible especially by a Bayonet coupling in the cap itself.

The type of fastening of the protective cap on the encoder housing shall be possible especially without tools, but it shall otherwise not be tied to any particular embodiment, so that in addition to Bayonet connections, other repeatedly releasable and connectable frictional and/or form-fitting connection means may be provided as well, such as, e.g., quarter-turn fastener connections, clamp-type connections, snap-on/snap-in connections, Velcro fastener connections, repeatedly releasable and connectable adhesive connections, e.g., by means of a double-sided annular adhesive strip, direct thread connection between the hollow-shaft encoder and motor-shaft protective cap, toggle-lever connection, splint-pin fastener connection, shaft-and-eyelet hinge connection, etc.

The hollow-shaft encoder and motor-shaft protective cap are especially coupled to each other axially at their face ends, however, in other embodiments they may also be connected to each other at their respective outer casings. For example, the hollow-shaft encoder may be accommodated at least partially in an axial recess in the motor-shaft protective cap, and the inner casing of the motor-shaft protective cap may rest on the outer casing of the hollow-shaft encoder. Analogously but conversely, the motor-shaft protective cap may also be accommodated at least partially in an axial recess in the hollow-shaft encoder, and the outer casing of the motor-shaft protective cap may be supported on an inner casing of the hollow-shaft encoder. Also, the face-end free rim of the motor-shaft protective cap may be accommodated in a circumferential annular groove in the face end of the hollow-shaft encoder and fixed there in a frictional and/or formfitting manner.

An additional characteristic of the closeability of a hollow-shaft encoder may also be any other geometric form of the protective cap. Namely, for example, a shorter or flatter shape in order to close and/or seal the rear shaft end of the encoder.

Especially, however, the motor-shaft protective cap is designed pot-shaped and has a shape that tapers away from the hollow-shaft encoder. However, the shape may also be purely cylindrical, hemispherical or part-spherical, an ellipsoid of revolution, a paraboloid of revolution (egg shape), or some other rotation-symmetrical pot-like shape.

The shape of the housing of the hollow-shaft encoder is preferably cylindrical, in such a way that the electrical connections for the power supply and the signal lines extend out radially from the outer casing.

BRIEF DESCRIPTION OF THE DRAWINGS

In the following text the invention will be explained in more detail based on drawings depicting only a single possible embodiment. Additional essential features and advantages of the invention will become apparent from the drawings and from their description.

The figures show as follows:

FIG. 4: a section along the longitudinal axis through the hollow-shaft encoder with motor-shaft protective cap according to FIG. 1;

FIG. 5: a top view of the hollow-shaft encoder with motor-shaft protective cap according to FIG. 4.

DETAILED DESCRIPTION OF THE PREFERRED EMBODIMENT OF THE INVENTION

Figure 1:
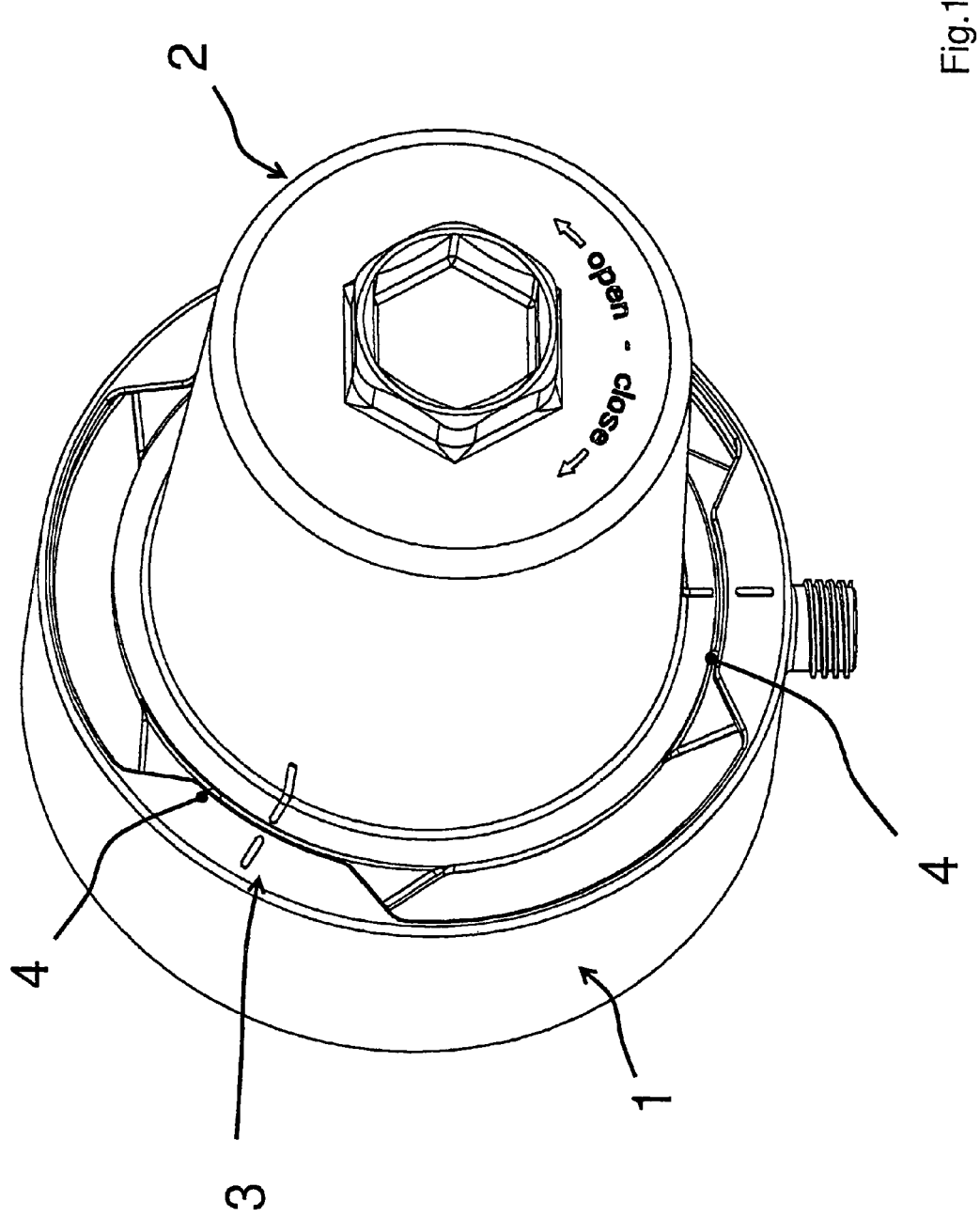
FIG. 1: a hollow-shaft encoder with motor-shaft protective cap according to the invention in the assembled condition in a perspective view.

Depicted in FIG. 1 is the hollow-shaft encoder 1 with motor-shaft protective cap 2 in the assembled condition, the motor-shaft protective cap 2 being connected by means of a 3-wing Bayonet connection 3 to the hollow-shaft encoder 1. According to FIG. 1, the motor-shaft protective cap 2 may be placed onto the hollow-shaft encoder 1 on its face end in three different positions for assembly purposes, and then twisted in a clockwise or counter-clockwise direction until the wings 8, 11 (see FIGS. 2 and 3) of the hollow-shaft encoder 1 and motor-shaft protective cap 2 come to rest above one another in the axial direction and can thus no longer be pulled apart in the axial direction. To further secure their position, an additional lock mechanism 4 may be provided in the relative position shown in the Figure, between the hollow-shaft encoder 1 and motor-shaft protective cap 2.

Figure 3:
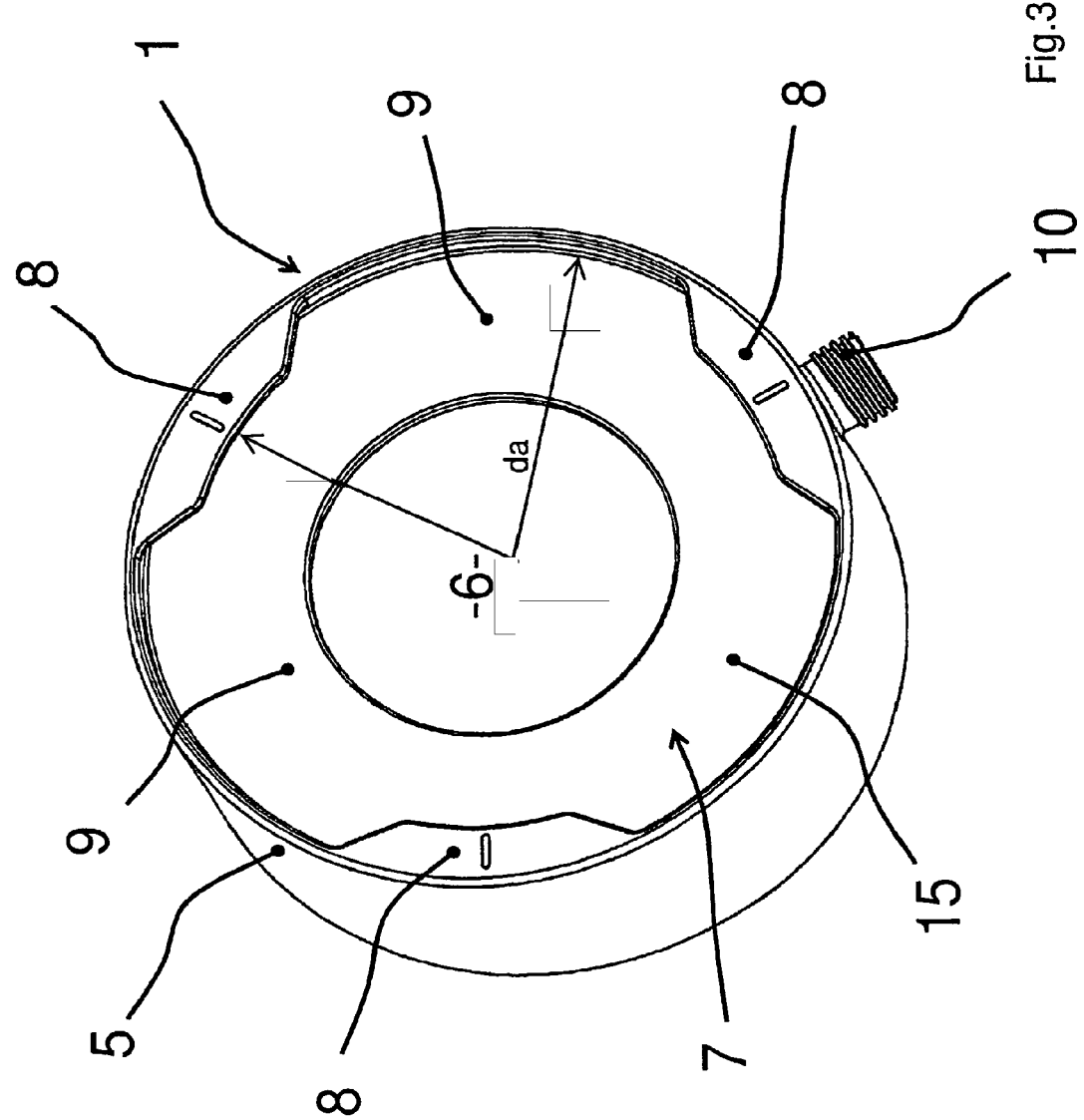
FIG. 3: a hollow-shaft encoder according to the invention in a perspective view.

FIG. 3 now shows the hollow-shaft encoder 1, which incorporates a cylindrical housing 5, in whose interior the complete electrical and mechanical components for a fully functional hollow-shaft encoder are accommodated. Extending centrically through the housing 5 is the through-opening 6 for accommodating the motor-shaft (not depicted). In one or both face ends of the cylindrical housing 5 a depression 7 then exists for the Bayonet connection 3, which may be milled-in or created in the injection mold as a "negative". The depression 7 incorporates three wings 8 that are evenly distributed along the circumference, whose inside diameter "di" is larger than the diameter of the through-opening 6. The inside diameter di is smaller, however, than the outside diameter "da" of the three widened regions 9 for threading-in the wings 11 (see FIG. 3) of the motor-shaft protective cap 2.

Provided on the casing of the hollow-shaft encoder 1 is the outlet and inlet 10 for the electrical cables for supplying the potentially required electrical power and routing of the measuring signals generated in the encoder 1. The outlet and inlet 10 for the electrical cables is provided in this case, by way of example, with a thread for coupling to a transmission cable and to a transducer and evaluation unit (not depicted), but it may be designed differently as desired in other embodiments, e.g., as a frictionally engaged plug-connection or as a screw-type or quick-connect luster terminal.

Figure 2:
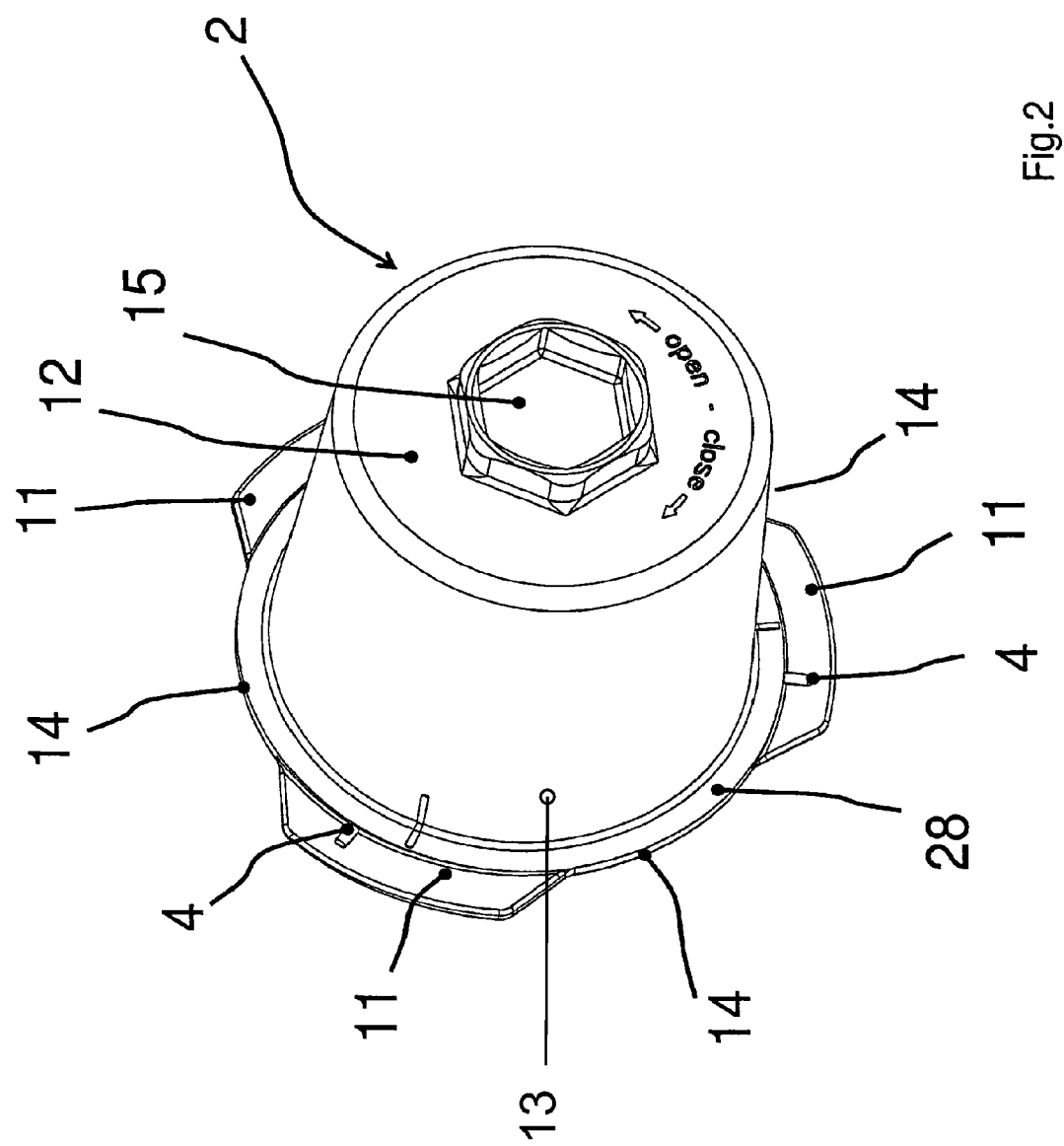
FIG. 2: a motor-shaft protective cap according to the invention in a perspective view.

FIG. 2 now shows the motor-shaft protective cap 2, which has a pot-like basic shape, with a conical casing 13 opening in an axial direction from a circular base disc 12 in the direction toward a radial extension in the form of the three wings 11. The three wings 11 are evenly spaced along the circumference, with three recesses 14 situated between them. Provided on the base disc 12 is a hexagon 15 for accommodating a tool during assembly/disassembly, if this should be necessary, for example after an extended operation without detaching the motor-shaft protective cap 2.

Provided on the wings as lock mechanism 4 are ribs that are embossed in the axial direction, which then come to rest in the axial direction on the underside of the wings 3 of the hollow-shaft encoder 1.

It is also possible, of course, to provide only two, or more than three wings 8, 11 of the Bayonet connection 3, depending on the requirements; however, preferred are three wings 8 on the hollow-shaft encoder 1 and three wings 11 on the motor-shaft protective cap 2. The wings 8, 11 also do not necessarily need to be spaced evenly along the circumference, but they may also enclose angles other than 120° (3 wings), 180° (2 wings), 90° (4 wings), 60° (6 wings) between them.

FIG. 4 shows a longitudinal section through FIG. 1, from which it is apparent that, between the hollow-shaft encoder 1 and motor-shaft protective cap 2 in the region of the Bayonet connection 3, an O-ring 16 is provided as a seal, which is seated in an annular groove 27, which are [sic] located in the annular transition region 28 between the casing 13 and wings 11 or recesses 14.

The hollow-shaft encoder 1 has the hollow encoder shaft 17, which is supported by means of two ball bearings 18 rotatable relative to the stator 19 of the hollow-shaft encoder 1. The hollow-shaft encoder 1, which is slipped onto the motor shaft, is fastened on the motor shaft (not depicted) in this case, for example, at the face end by means of a shaft mounting 20 with threaded disc 21 and retaining ring 22 to prevent removal in the axial direction. An added protection (e.g. a feather key) against turning of the hollow-shaft encoder 1 on the motor-shaft may be provided, in addition to the frictional seat contact 23. Other fastening methods of the hollow-shaft encoder 1 on the encoder shaft 17 are also possible, of course, such as e.g., with so-called torque arms.

FIG. 5 also shows the top view of FIG. 1 and side view of FIG. 4 from the right. Reference numeral 24 indicates an additional lock mechanism on the undersides of the wings 8 of the hollow-shaft encoder 1, in addition to or as an alternative to the lock mechanism on the wings 11 of the motor-shaft protective cap. This may also serve to establish a closing direction 25 and opening direction 26, but continuous turning in both directions may be possible as well.

FIGURE LEGEND

1. Hollow-shaft encoder
2. Motor-shaft protective cap
3. Bayonet connection between 1 and 2, on 2
4. Lock mechanism between 1 and 2
5. Housing of 1
6. Through-opening in 5
7. Depression
8. Wing of 1
9. Widened region of 1
10. Inlet and outlet for electrical cables
11. Wing of 2
12. Base disc
13. Conical casing
14. Recess
15. Tool insertion point
16. O-ring
17. Encoder shaft (hollow)
18. Ball bearing
19. Stator of 1
20. Shaft mounting
21. Threaded disk
22. Retaining ring
23. Frictional seat contact
24. Lock mechanism between 1 and 2, on 1
25. Closing direction of 3
26. Opening direction of 3
27. Annular groove for 16 in 2
28. Annular transition area between 13 and 11, and 13 and 14, respectively di: Inside diameter of 7 and 8, respectively
da: Outside diameter of 7 and 9, respectively

What is claimed is:

1. A hollow-shaft encoder (1) and motor-shaft protective cap (2), which are repeatedly releasable from and connectable to each other by means of connection means (3), said encoder (1) incorporating all electrical and mechanical components for a pick-up and output of measuring signals and the protective cap having none of the electrical or mechanical components for the pick-up and output;

wherein the encoder is housed in a casing;
wherein the connection means (3) are integrated in the encoder (1) and protective cap (2) and form a connection between the encoder (1) and protective cap (2);
wherein the protective cap (2) is conical and tapers away from the hollow-shaft encoder (1);
wherein the encoder has first wings (8) which extend inward from the periphery of a first end of the encoder casing and the protective cap has an annular transition region (28) that extends outward from the periphery of a first end of the protective can and second wings (11) which extend outward from the periphery of the annular transition region;
wherein the first and second wings constitutes the connection means (3);
wherein the first end of the encoder casing includes a depression (7) formed by widened regions (9), said widened regions extending radially inward from the inner periphery of the encoder casing and spaced from the first end of the encoder casing, the first wings being incorporated in the depression;
wherein a portion of the first end of the protective cap and the second wings extend into the depression, the second wings extend under and engage the first wings when rotated in an assembled position so as to prevent the protective cap from being pulled off the encoder in the axial direction;
wherein the annular transition region includes an annular groove and a sealing ring situated in the annular groove and contacting a portion of the encoder casing when the protective cap is engaged with the encoder casing;
wherein the encoder is accommodated at least partially in an axial recess in the protective cap; and
wherein means to accommodate a tool to remove the protective cap from the encoder is fixed on a second end of the protective cap.

2. A hollow-shaft encoder (1) with motor-shaft protective cap (2) according to claim 1, wherein the encoder casing includes an inlet and an outlet (10) for electrical cables to and from the encoder (1).

3. A hollow-shaft encoder (1) with motor-shaft protective cap (2) according to claim 2, wherein the inlet and outlet (10) for the electrical cables to and from the encoder (1) extend out from the encoder casing via a L-shaped angle connection.

* * * * *